United States Patent
Gschwind et al.

(10) Patent No.: US 11,520,764 B2
(45) Date of Patent: Dec. 6, 2022

(54) MULTICRITERIA RECORD LINKAGE WITH SURROGATE BLOCKING KEYS

(71) Applicant: International Business Machines Corporation, Armonk, NY (US)

(72) Inventors: Thomas Gschwind, Zurich (CH); Christoph Adrian Miksovic Czasch, Zurich (CH); Paolo Scotton, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 16/454,987

(22) Filed: Jun. 27, 2019

(65) Prior Publication Data
US 2020/0409922 A1 Dec. 31, 2020

(51) Int. Cl.
*G06F 16/22* (2019.01)

(52) U.S. Cl.
CPC .................. *G06F 16/2255* (2019.01)

(58) Field of Classification Search
None
See application file for complete search history.

(56) References Cited

U.S. PATENT DOCUMENTS

| | | | | |
|---|---|---|---|---|
| 6,567,817 B1 * | 5/2003 | VanLeer | ............ | G06F 12/0871 707/999.102 |
| 7,899,796 B1 * | 3/2011 | Borthwick | ........ | G06F 16/24556 707/692 |
| 8,316,047 B2 | 11/2012 | Bayliss | | |
| 9,767,127 B2 | 9/2017 | Feldschuh | | |
| 10,599,614 B1 * | 3/2020 | Borthwick | ............ | G06N 5/022 |
| 2013/0227195 A1 * | 8/2013 | Beaverson | ............ | G06F 3/0611 711/216 |
| 2015/0213375 A1 * | 7/2015 | Malewicz | ............ | G06F 16/137 707/737 |
| 2015/0254308 A1 | 9/2015 | Scott et al. | | |
| 2015/0254329 A1 * | 9/2015 | Agarwal | ............... | G06F 40/295 707/616 |

(Continued)

OTHER PUBLICATIONS

Malhotra et. al., "Incremental Entity Resolution from Linked Documents", Technical Report TR-DAIF-2014-1, 2018 (Year: 2018).*

(Continued)

*Primary Examiner* — Aleksandr Kerzhner
*Assistant Examiner* — Anugeetha Kunjithapatham
(74) *Attorney, Agent, or Firm* — Scully, Scott, Murphy & Presser, P.C.; Daniel P. Morris (57) ABSTRACT

A computer-implemented method and a related system for record linkage of an incoming record to a reference data set may be provided. The method comprises providing a reference data set comprising a plurality of records, each record comprising a plurality of attributes. The method comprises further assigning each of the plurality of records an initial surrogate identifier value, assigning a plurality of block identifiers to each of the records by applying a locality sensitive hashing function to a predefined attribute of the records, resulting in the plurality of the block identifiers, and determining a final surrogate identifier value to each of the records assigned to one of the blocks such that the final surrogate identifier values in each block are uniformly distributed.

16 Claims, 6 Drawing Sheets

(56) References Cited

U.S. PATENT DOCUMENTS

2015/0269178 A1* 9/2015 Rhodes .................. G06F 16/958
707/700
2017/0293671 A1* 10/2017 Korn ..................... G06F 16/211

OTHER PUBLICATIONS

Peter Christen, "A Survey of Indexing Techniques for Scalable Record Linkage and Deduplication", IEEE Transactions on Knowledge and Data Engineering. vol. Z. No. Y. ZZZZ 2011, 2011 (Year: 2011).*

Baxter et. al., "A Comparison of Fast Blocking Methods for Record Linkage", CMIS Technical Report 03/139, 2003 (Year: 2003).*

Kim et. al., "HARRA: Fast Iterative Hashed Record Linkage for Large-Scale Data Collections", 2010 (Year: 2010).*

Fellegi, I. P. et al., "A Theory for Record Linkage", Journal of the American Statistical Association, Dec. 1969, vol. 64, No. 328, pp. 1183-1210.

Getoor, L. et al., "Entity Resolution: Tutorial", 2012(month unknown), 179 pages.

Leskovec, J. et al., "Mining of Massive Datasets", Cambridge: Cambridge University Press, 2014(month unknown), 513 pages.

Kolb, L. et al., "Dedoop: Efficient Deduplication with Hadoop." Proceedings of the VLDB Endowment, VLDB '12, Aug. 2012, vol. 5, No. 12, pp. 1878-1881.

Le, P. et al., "Improving Entity Linking by Modeling Latent Relations Between Mentions", CoRR, Apr. 27, 2018, vol. 1804, No. 10637, 10 pages.

Mikolov, T. et al., "Efficient Estimation of Word Representations in Vector Space", 1st International Conference on Learning Representations, Sep. 7, 2013, Workshop Track Proceedings, 12 pages.

Qian, K. et al., "Active Learning for Large-Scale Entity Resolution", Proceedings of the 2017 ACM on Conference on Infomnation and Knowledge Management, Nov. 6-10, 2017, ACM, vol. 10, No. 1145, pp. 1379-1388.

Fagin, R., et al.,"Extendible Hashing—a Fast Access Method for Dynamic Files", ACM Transaction on Data Systems, vol. 4, No. 3, Sep. 1979, pp. 315-344.

Miamun, A., et al., "Efficient Record Linkage Algorithms Using Complete Linkage Clustering", PLoS ONE, Accepted Apr. 13, 2016, Published Apr. 28, 2016, 21 pages, vol. 11, No. 4.

* cited by examiner

MULTICRITERIA RECORD LINKAGE WITH SURROGATE BLOCKING KEYS

BACKGROUND

The present disclosure relates generally to record linkage, and more specifically, to a computer-implemented method for record linkage of an incoming record to a reference data set. The present disclosure relates further to a related record linkage system for a record linkage of an incoming record to a reference data set, and a computer program product.

Content management remains one of the major topics in enterprise IT organizations. This does not only apply to unstructured data but also to a combination of structured data from traditional databases and unstructured data of any kind. For instance, enterprise AI (artificial intelligence) applications require an integration of data from many data sources, as well as the ability to link and establish relations among data of these data sources. This requirement applies especially to cognitive enterprise data platforms in order to produce meaningful results using as many different data sources as possible.

The field of record linkage (RL) has been extensively researched in the last decades. RL is in charge of joining identical entities (e.g., companies, organizations, products, addresses) in structured records of different data sets independently of the representation. Originally, it was formalized by Fellegi and Sunter in 1969 and the tutorial from Lise Getoor provides an excellent overview of use cases and techniques. RL has been used to link entities from different sets or de-duplicated/canonize entities within a given set. To this extent, several approaches have been envisioned ranging from feature matching or rule-based to machine-learning (ML) based approaches. Feature matching approaches tend to be domain and language specific and therefore algorithms need to be selected, composed and tuned for a given task. On the other hand, ML approaches require the ability of sufficiently large and curated training sets which is often a tough challenge. More recently, distributed representations of words—in particular, word embeddings—and deep learning algorithms have drawn the attention of the research community since it may have reduced the amount of human expertise required to construct an RL system. In addition, promising active learning-based approaches have been proposed.

Typically, RL is performed in batch mode to link a large number of entities between two or more databases or other kinds of data sources. A challenge in enterprise AI applications is the ever-increasing amount of unstructured data like news, blocks, social media content, transcripts, etc., and the ever-increasing need of its integration with enterprise data typically stored in a structured form in, e.g., relational databases. As a consequence, RL has to be performed between structured records and unstructured documents. This large amount of data may flow in streams for rapid consumption and analysis by enterprise systems; therefore, RL needs to be executed "on-the-fly", i.e., in real-time. The entities to be linked in unstructured data may be identified as mentioned by a Named Entity Recognition (NER) module which may be part of a natural language processing (NLP) pipeline.

RL includes scoring input entries against a reference data set (RDS) in order to find the best matching RDS entry according to a certain set of criteria. Considering that the RDS can be potentially very large—i.e., in the order of hundreds of millions of entries—this scoring may become quickly prohibitive in terms of computational complexity and resources. To alleviate this, a classical approach consists of decomposing RDS into blocks comprising "similar" entries. The input entry may be associated with a given block and the scoring (i.e., to find the best match) may be performed only against the RDS entries belonging to that block. Typically, these blocks—and therefore the association in the input entry with a block—may be identified by means of a hashing function computed on one field of the entries. One may define as blocking key the result of the application of the hashing function, also called blocking function.

In the literature, one may also find examples using a blocking function for a single criterion. Now, blocking functions can be applied to multiple fields to obtain multiple blocking dimensions. The set of candidate RDS entries to be scored may then be computed as the intersection of the blocks corresponding to each blocking dimension. This operation, however, is computational-wise expensive, in particular, in the order of the sum of the cardinality of each block and therefore not compatible with real-time operations.

However, the known RL technologies are not well-suited to overcome the resource hunger for ever-increasing amounts of data. Thus, it is an objective of the proposed concept to address the field of record linkage in a way to make it applicable for large amounts of data and real-time environments.

SUMMARY

According to one aspect of the present invention, a computer-implemented method for record linkage of an incoming record to a reference data set may be provided. The method may comprise providing a reference data set comprising a plurality of records. Each of the reference data set's record may comprise a plurality of attributes.

The method may further comprise assigning each of the plurality of records an initial surrogate identifier value, assigning a plurality of block identifiers to each of the records by applying a locality sensitive hashing function to a predefined attribute of the records, resulting in the plurality of the block identifiers, and determining a final surrogate identifier value to each of the records assigned to one of the blocks such that the final surrogate identifier values in each block are uniformly distributed.

According to another aspect of the present invention, a related record linkage system for a record linkage of an incoming record to a reference data set may be provided. The system may comprise a reference data set comprising a plurality of records. Each of the records may comprise a plurality of attributes.

The method may also comprise a first assignment unit adapted for assigning each of the plurality of records an initial surrogate identifier value, a blocking function module adapted for assigning a plurality of block identifiers to each of the records by applying a locality sensitive hashing function to a predefined attribute of the records, resulting in the plurality of the block identifiers, and a second assignment unit adapted for assignment of a final surrogate identifier value to each of the records assigned to one of the blocks, such that the final surrogate identifier values in each block are uniformly distributed.

The proposed computer-implemented method for record linkage of an incoming record to a reference data set may offer multiple advantages and technical effects:

The proposed concept may be applied to a plurality of different tasks in the field of record linkage. May it be that entries of two databases should be related or that streaming incoming data from, e.g., a news feed, social media and/or other online sources should be related to records of an existing reference data set, i.e., entries of a database. The proposed concept may allow to look up whether an entity is referenced by a block with a runtime complexity in the order of 1. This may—in contrast to traditional RL approaches—allow also incoming streaming data to be linked to very large reference data sets in the order of hundreds of millions of entries at high speed. In contrast, traditional records linkage and related scoring approaches for finding matching records may quickly become prohibitive in terms of a required time for its competition and the related complexity. It would simply take too long to relate one incoming new record to any of the existing records in a reference data set, i.e., an existing database with records the new incoming record should be related to.

This problem may now elegantly be solved because the reference data set in question is not taken as provided, but may be prepared in a preprocessing step to deal with high-speed RL. The preprocessing may enable a much quicker relationship building of newly received records to already existing records in the reference data set. It may no longer be required to compare the newly received record with each and every record in the existing database. Instead, "shortcuts" in the form of blocks that relate to groups of records in the reference data set may be used such that a two-step approach—determining firstly a potential block and then a record within the block—is way more efficient than any traditional approach.

An instrumental concept is the determination of the uniform distribution of final surrogate identifier values of records within each determined block of records. The blocking function, i.e., the locality sensitive hashing function to determine a block identifier based on the predefined attribute may build the second foundation concept of the proposed inventive method and the related system. Basically, the preprocessing step aims at aligning the records—i.e., entries—such that they can be looked up in constant time by linear interpolation of locations/positions of their identifiers.

Additionally, also the preprocessing is computation-wise not so resource-hungry as one would expect. Also here, a multi-step approach is followed: (a) assign preliminary or initial surrogate identifier values to records in the reference data set and (b) apply a locality sensitive hashing function to a predefined attribute of the records and the reference data set. Last but not least, (c) new, final surrogate identifier values are assigned to records in a way that they are uniformly distributed within each block.

In practical implementations, it may turn out that there are many blocks having only one or two entries. Because two entries in the block are by definition always uniformly distributed—which also applies to blocks with only one entry inside—the reshuffling of those identifiers does not have to be performed for each and every determined block. Also this reduces the computational effort during the preprocessing.

Furthermore, the proposed concept is not limited to only one attribute but may also be applied to a plurality of attributes. Generally, each attribute—or criterion—may be considered separately. Thus, for a second attribute, a second block structure may be managed. In general, there are not any cross dependencies between the blocks relating to the first attributes in the block relating to the second attribute. If computationally possible, however, the two blocks may use the same surrogate identifiers to refer to the records in the RDS.

However, it may also be possible to combine attributes during the block building process. This may be achieved by applying the locality sensitive hashing function to a combination of attributes—e.g., name/first name or company name/location or street name/number or song name/artist. Any other combination should be possible. Such a combination of attributes is also not limited to just two attributes. Any plurality of attributes may be used.

Hence, the proposed concept may with only little effort be expanded to multiple attributes by applying the locality sensitive hashing function to a predefined set of attributes of the records resulting in the plurality of the block identifiers. This may even be done in a single logical step and loop process over all records in the reference data set. Thus, the additional computational cost would be pretty limited.

In the next section, a generalized more theoretical model of the proposed concept may be described:

An RDS with $|E|$ entries may be assumed. Each entry, representing an entity $e_i$, $i \in [0, |E|-1]$ has H attributes. For example, if the entities are companies, the attributes can be street address, city, country, industry, number of employees, etc.

An RL problem with C<H criteria may be considered. A blocking key $b_{c,ei}$, $c \in [0, C-1]$, $i \in [0, |E|-1]$ is the result of a blocking function $B_c$, $h \in [0, C-1]$ applied on the attribute h of entity $e_i$. Entities having the same blocking key—i.e., the same value is returned by the locality sensitive hashing function—belong to the same block. Therefore, for a given dimension h, entities are gathered in blocks noted $B^m_c$, where m is in the range of numbers that may be returned by the locality sensitive hashing function. Each $B^m_c$ is associated with a blocking key $b^m_c$. When processing an input (i.e., an entry to be linked) we need to identify the set of candidate RDS entities.

Figure 2:
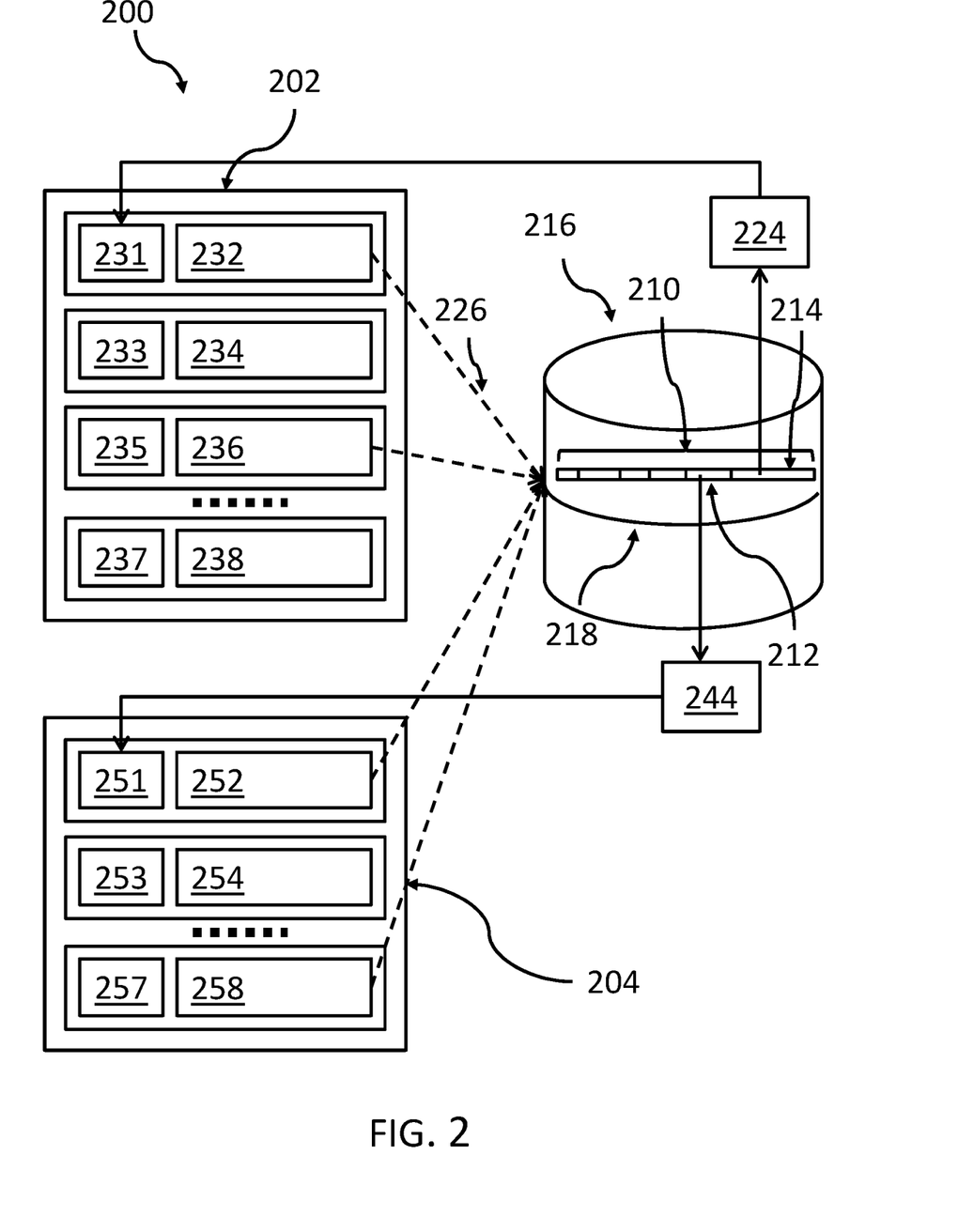
FIG. 2 shows a block diagram of a plurality of blocks, the reference data set and a function instrumental for a linkage of a new record in an embodiment.

To this end, one first computes the set of blocking keys $\{b_{c,I}\}$, $c \in [0, C-1]$ related to the input I. Given these keys one defines the candidate RDS entities set as $C_I = \cap_{c \in [0, C-1]} B_{c,I}$, $B_{c,I}$ being the set of RDS entries having $b_{c,I}$ has blocking key—in other words, $B_{c,I} = B^m_c \Longleftrightarrow b_{c,I} = b^m_c$. It may be noted that this concept is depicted in FIG. 2 for two attribute (see below).

Thus, the here proposed concept may add a preprocessing step to improve the blocking key data structure in order to optimize the search computational complexity. The goal is to compute the intersection between the sets of the various dimensions with a complexity of $O(\min_{c \in [0, C-1]} |B_0|)$, i.e., linear with the size of the smallest set. In an embodiment, the preprocessing step aims at aligning the entities such that they can be looked up in constant time by linear interpolation of their identifiers.

In the following, additional embodiments of the inventive concept—applicable to the method, as well as the related system—will be described.

According to one advantageous embodiment, the method may also comprise sorting the block identifiers by its cardinality, i.e., by the number of records comprised in the block. The determining of the final surrogate identifier value (FS-ID) may comprise performing for each block, starting with the largest block, i.e., the one having the highest number of records, i.e., highest cardinality:

$$FS\text{-}ID = \text{offset} + i * \text{gap, wherein}$$

FS-ID=final surrogate identifier value,
gap=E/B and offset=gap/2, wherein
E=the total number of records in the reference data set,
B=number of records in the given block, and i=the number of a position of an initial surrogate identifier value in a given block, such that $0=i<B$.

The computation way require only simple mathematical operations like add, multiply and divide, which results may be determined without high computational costs. Thus, the preprocessing may be performed advantageously with just little effort.

According to a preferred embodiment of the method, in case a final surrogate identifier value may be determined which value has already been determined during the determining the final surrogate identifiers of a previous block—thus, if a conflict case may happen—a next closest final surrogate identifier value may be chosen for the respective record, provided that the final surrogate identifier values in the respective block continue to be uniformly distributed. Thus, conflicts in values of surrogate identifiers and the condition of a uniform distribution of the surrogate identifiers in each of the blocks may be addressed simultaneously.

According to one additional embodiment, the method may also comprise testing whether a next closest available value for the final surrogate identifier may provide a uniform distribution for a given block B according to the following formula:

$$\text{pos}(id)=\text{round}[(B-1)*((id-B(0)/B(B-1)-B(0))],$$

$$\forall i \in [0, B-1]: B(i) = B(\text{pos}(B(i))), \qquad (1)$$

wherein
id=chosen next closest final surrogate identifier value, i.e., an integer number that should be tested for its existence in the respective block,
pos=position of the value id in a given block, given that the positions within each block may be treated like an index (integer value) of locations in the block; i.e., if a given block may have five surrogate identifiers, they may take the positions, e.g., 1 to 5 (or, 0 to 4);
B=number of records in the given block, and
B(x)=value of identifier in array B(x) at position x.

Thus, if choosing a next closest final surrogate identifier value and finding the same value at pos(id), this counts as uniform distribution. Otherwise, another next identifier value would be used and the test needs to be repeated until a next closest FS_ID without any conflict would be found.

As an example, it may be that there are three blocks with surrogate identifiers B1=[200, 300, 400, 500], B2=[98,196, 294] and B3=[200, 294, 400]. It may also be assumed that one needs to look up whether 294 is comprised in B3. The position pos(294) can be identified by $2*((294-200)/(400-200))=0,94 \approx 1$, according to the formula above.

According to a useful embodiment, the method may also comprise assigning the determined final surrogate identifier value also to records in subsequent blocks, i.e., those having a smaller cardinality—which have the same initial surrogate identifier value as the record having been assigned the final surrogate identifier value. Thus, consistency—in particular down-stream consistency—may be guaranteed such that a surrogate identifier always points to only one record.

According to one advantageous embodiment of the method, the blocks with assigned records may be organized as one or more arrays of surrogate identifiers using the surrogate identifier as index in the reference data set. Thus, not the entries, i.e., records, of the data set need to be rearranged, which would mean a significant computations effort, but only the initial and/or final surrogate identifier value may be rearranged in the array. However, it may also be required to exchange a surrogate identifier directly linked (or being part of) to the record in the reference data set in order to keep consistency among a surrogate identifier and the related record.

According to one optional embodiment of the method, the predefined attribute of the records may be a combination of at least two attributes, e.g., first name/last name, company name/location, etc. This may be one option to handle a combination of attributes, in particular those attributes having a logical dependency. In this case, the location sensitive hashing function may be applied to the combination of attributes. The alternative case of independent attributes has already been discussed above. This way, a plurality of attributes may be combined.

Hence, according to one permissive embodiment of the method, the steps of assigning a plurality of block identifiers may comprise determining a final surrogate identifier value for a second predefined attribute. In this case, there may be no logical dependency between the attributes. Thus, a step of assigning initial surrogate identifier values and final surrogate identifier values may be performed for a second attribute, including the conflict checks, as discussed above.

According to one enhanced embodiment, the method may also comprise receiving a new record comprising the predefined attribute—e.g., a social media comment—applying the locality sensitive hashing function to the predefined attribute of the newly received record resulting in an access block number, and accessing the block having the resulting access block number. Then, a scoring function may be used to determine the best matching record identifiable via the final surrogate identifier value in the reference data set. Additionally, in case the incoming record is unstructured or semi-structured, a filtering of the received records by a natural language processing unit and attribute identification unit may become active before the here proposed record linkage process may be performed.

According to one further enhanced embodiment, the method may also comprise assigning a plurality of second block identifiers to each of the records by applying a second locality sensitive hashing function to a second predefined attribute of the records, resulting in the plurality of the second block identifiers. This embodiment may also comprise determining final surrogate identifiers to each of the records assigned to one of the blocks such that the final surrogate identifier values in each block are uniformly distributed.—In one embodiment, the locality sensitive hashing function used for the first attribute and the second locality sensitive hashing function may be the same or different.

According to an even more enhanced embodiment, the method may also comprise receiving a new record comprising the predefined attribute and the second predefined attribute, applying the second location sensitive hashing function to the predefined attribute resulting in an access block number, applying the second location sensitive hashing function to the second predefined attribute resulting in a second access block number, and joining the block having assigned the (first) access block number and the second access block number. This may be performed by looking up each surrogate identifier value—in particular, preferably of the smaller of the two blocks in the larger of the two blocks—at the following pre-determined position: $\text{pos}(id)=\text{round}[(B-1)*((id-B(0)/B(B-1)-B(0))]$.

Thus, the case of two independent attributes may advantageously comprise a merger of the identified blocks in order to determine, by a scoring function, to which records in the joined block an incoming record would best fit to. Of course, this concept may be expanded to a plurality of attributes.

It should also be noted that if two or more sets of criteria are used, the intersection of the blocks obtained for each criterion may be computed with the run-time complexity in the order of the cardinality of the smallest of the data sets. Thus, if compared to traditional approaches a significant compute resource saving.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Preferred embodiments of the invention will be described, by way of example only, and with reference to the following drawings.

DETAILED DESCRIPTION

In the context of this description, the following conventions, terms and/or expressions may be used:

The term 'reference data set' (RDS) may denote a plurality of records to which a newly received record should be related to by means of identifying entities to which a record in the reference data set and the newly received record may relate to. The reference data set may be a database or any other form of content management system.

The term 'records' may denote a data item relating to an entity stored in the reference data set.

The term 'attributes' may denote identifiable and pre-defined number fields in a record identifying one criterion of the item the record relates to.

The term 'initial surrogate identifier' may denote an integer number being assigned to each of the records in the reference data set in an initial processing step of the pre-processing. The surrogate identifier may not be intermixed with one of the keys of the attributes of the related record. The surrogate identifiers may be seen as an additional field of the respective record. During the process of the here proposed concept, the initial surrogate identifier may be replaced by final surrogate identifier values. Some of the values of the initial surrogate identifiers and the final surrogate identifier values may be identical. It may also be noted—for simplicity reasons—that the expression "assigning a surrogate identifier" may actually be equivalent to assigning a "surrogate identifier value". It may be understood that this concept may be applicable—i.e., used synonymously—to any other abstract value description (e.g., block, block number, block number value) and its related value.

The term 'block identifier' may denote a unique descriptor—e.g., a numerical value—allowing a unique identification of a block of a plurality of surrogate identifier values (initial or final).

The term 'locality sensitive hashing function' may denote a technique for quickly estimating how similar two attributes are. Different measures for similarity models or similarity functions may be applied. Typically, the similarity may be sentenced as the inverse of a distance metric. Examples of a locality sensitive hashing function may be the MinHash or the SimHashing function.

The term 'final surrogate identifier'—i.e., 'final surrogate identifier values—may denote an integer value instrumental for identifying a specific record. The surrogate identifier may be used as a "natural" key, i.e., a specific field or attribute of a record. Initially, initial surrogate identifier values may be assigned to the records in the reference data set. These initial surrogate identifier values may be replaced by final surrogate identifier values according to the here proposed concept, i.e., under the condition that they are uniformly distributed in each of the determined blocks.

The term 'uniformly distributed' may denote that between the values of a plurality of surrogate identifiers and a block the same distance exists. E.g., if a block comprises five surrogate identifiers of the values 5, 10, 15, 20, 25 these may be denoted as uniformly distributed. In contrast, the sequence 5, 10, 15, 20, 85 does not comprise uniformly distributed values, because the distance between the first four values is 5, while the distance between 20 and 85 equals 65 instead of 5.

The term 'cardinality' may denote the number of elements in a given set. If the set comprises [2, 4, 6], i.e., three elements, the cardinality is 3.

The term 'largest block' may denote a block of surrogate identifier values comprising the largest number of individual surrogate identifier values.

The term 'next closest final surrogate identifier' (i.e., its next closest value) may denote a surrogate identifier value which does not exactly match the requirement of a uniform distribution in a given block. However, the next closest final surrogate identifier value may be close enough to a value which would establish a uniform distribution, such that a rounded next closest final surrogate identifier value would establish an equal or uniform distribution. As rounding function, formula (1) may be used.

As an example, a block with surrogate identifiers values 100, 200, 300, 400, 500 may be given. A sixth surrogate identifier value, e.g., 600 should also be part of the block. However, it may turn out that it is not possible to use 600 because in a previous block—i.e., a block which is larger than the current block and which has been assigned final surrogate identifier values in an earlier assignment step—the final surrogate identifier value 600 may have already been used. Thus, 601 of 599 may be used as next closest final surrogate identifier value. The completely exact uniform distribution consideration may not be met, but the block of surrogate identifier values 100, 200, 300, 400, 500, 601 (of 599) may only deviate just a little from a perfect uniform distribution.

Thus, it may be advantageous if the algorithm to assign the final surrogate identifier values may leave "some" space before and after the smallest and largest surrogate identifier values, as well as between the surrogate identifiers to allow interweaving of surrogate identifier values of subsequent blocks. Additionally, it may be useful to keep track of which surrogate identifier value has been assigned to which entity; this may be done to ensure the unicity of the surrogate identifier assignments.

In the following, a detailed description of the figures will be given. All instructions in the figures are schematic. Firstly, a block diagram of an embodiment of the inventive computer-implemented method for record linkage of an incoming record to a reference data set is given. Afterwards, further embodiments, as well as embodiments of the record linkage system for a record linkage of an incoming record to a reference data set, will be described.

Figure 1:
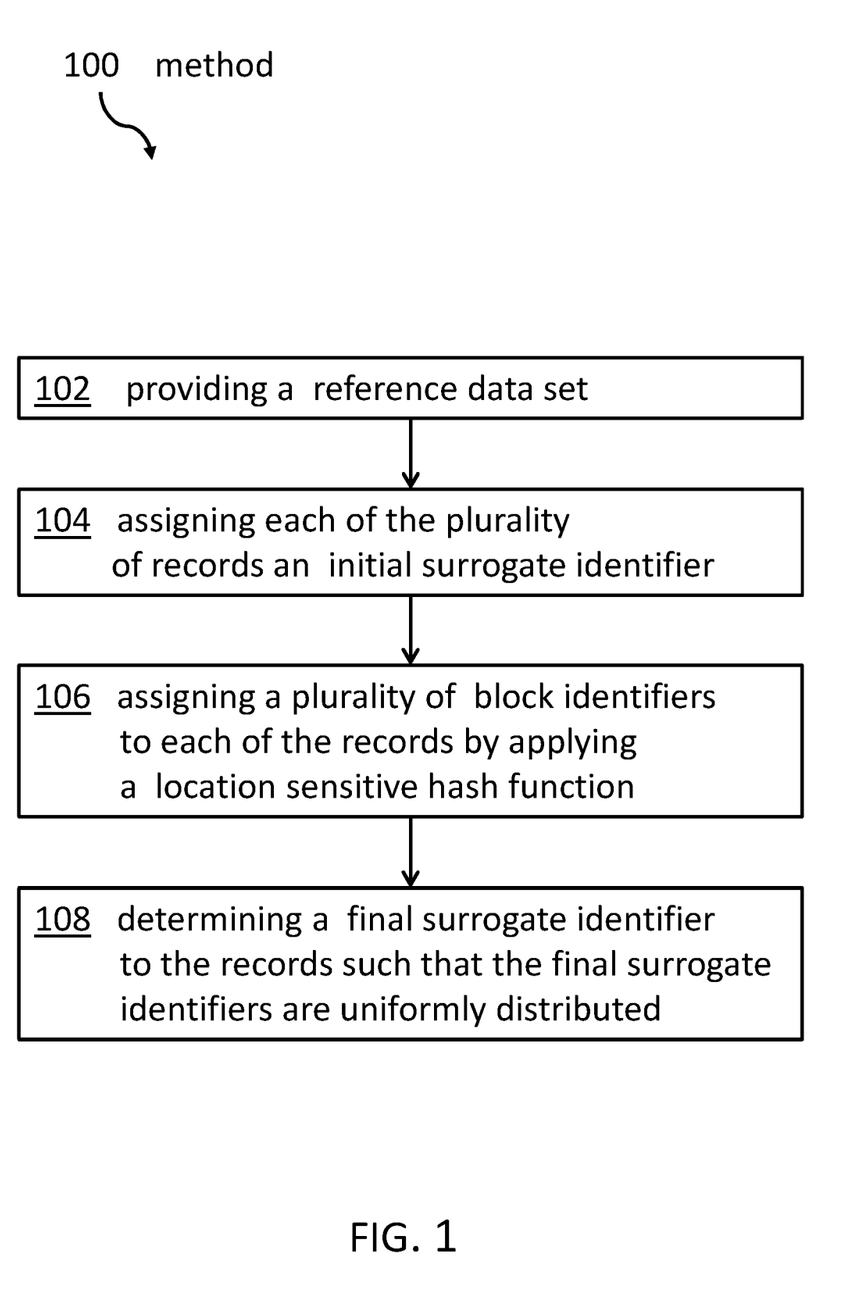
FIG. 1 shows a block diagram of an embodiment of the inventive computer-implemented method for record linkage of an incoming record to a reference data set.

FIG. 1 shows a block diagram of an embodiment of the computer-implemented method 100 for record linkage of an incoming record to a reference data set. The method 100 comprises providing, 102, a reference data set—e.g., a database, a content management system or similar comprising a plurality—in particular E entities—of records, of which each record comprises or has assigned a plurality of attributes. These H attributes may be organized as one predefined main attribute, a plurality of secondary attributes. However, the proposed concept does not require a main attribute in a sense of a primary access key.

The method 100 comprises furthermore assigning, 104, each of the plurality of records an initial surrogate identifier value—ideally between 0 and E−1—, and assigning, 106, a plurality of block identifiers—which may also be only 1—to each of the records, i.e., to each of the initial surrogate identifier values—by applying a locality sensitive hashing function (which may also be denoted as blocking function) to a predefined attribute of the records, resulting in the plurality of the block identifiers. The blocking function may, e.g., be a MinHashing function or a SimHashing function. Other locality sensitive hashing functions may also be applied.

In an embodiment, the core portion of the method 100 comprises determining, 108, a final surrogate identifier value to each of the records assigned to one of the blocks such that the final surrogate identifier values in each block are uniformly distributed. Alternatively, the locality sensitive hashing function may be applied to a predefined set of attributes of the records, resulting in the plurality of the block identifiers such that a separate group of block may exist for each attribute.

FIG. 2 shows a block diagram 200 of a first data structure 202 of a plurality of blocking keys 231, 233, 235, ..., 237 relating to a first attribute, the reference data set 216, as well as a second data structure 204 of a plurality of second blocking keys 251, 253, ..., 257. More similar data structures for further attributes may exist.

A record 218—detailed as structure 210—in the reference data set 216 may be organized in a plurality of fields 212, 214 which separation is indicated by vertical lines. It may be assumed that the field 214 is the predetermined first attribute and field 212 is the predetermined second attribute on which the record linkage is based.

The plurality of blocks is, e.g., organized as an array 202 comprising the plurality of blocking keys 231, ..., 237 and related lists of one or more final surrogate identifier values 232, 234, 236, 238. A comparable data structure 204 can be found for the second attribute 212, e.g., comprising the plurality of blocking keys 251, 253, 257 and related lists of one or more final surrogate identifier values 252, 254, 258.

The dashed lines 226 indicate that a plurality of identical final surrogate identifier values distributed across different blocks 231, ..., 237, as well as 251, ..., 257 are related to the same record or entity 218 in the reference data set 216. Thus, it is not be required to reorganize the plurality of records 218 of the reference data set 216 in order to build the blocks. However, an array of surrogate identifiers in the blocks is sufficient. This may also save lots of storage space because the records 218 of the reference data set 216 are only stored once. In this figure, the locality sensitive hashing function 224 is related to the first attribute 214 and the second locality sensitive function 244 is related to the second attribute 212. It may be noted that the locality sensitive hashing function 224 and the second locality sensitive function 244 for practical reasons be identical or the same; however, they may also be different.

Figure 3:
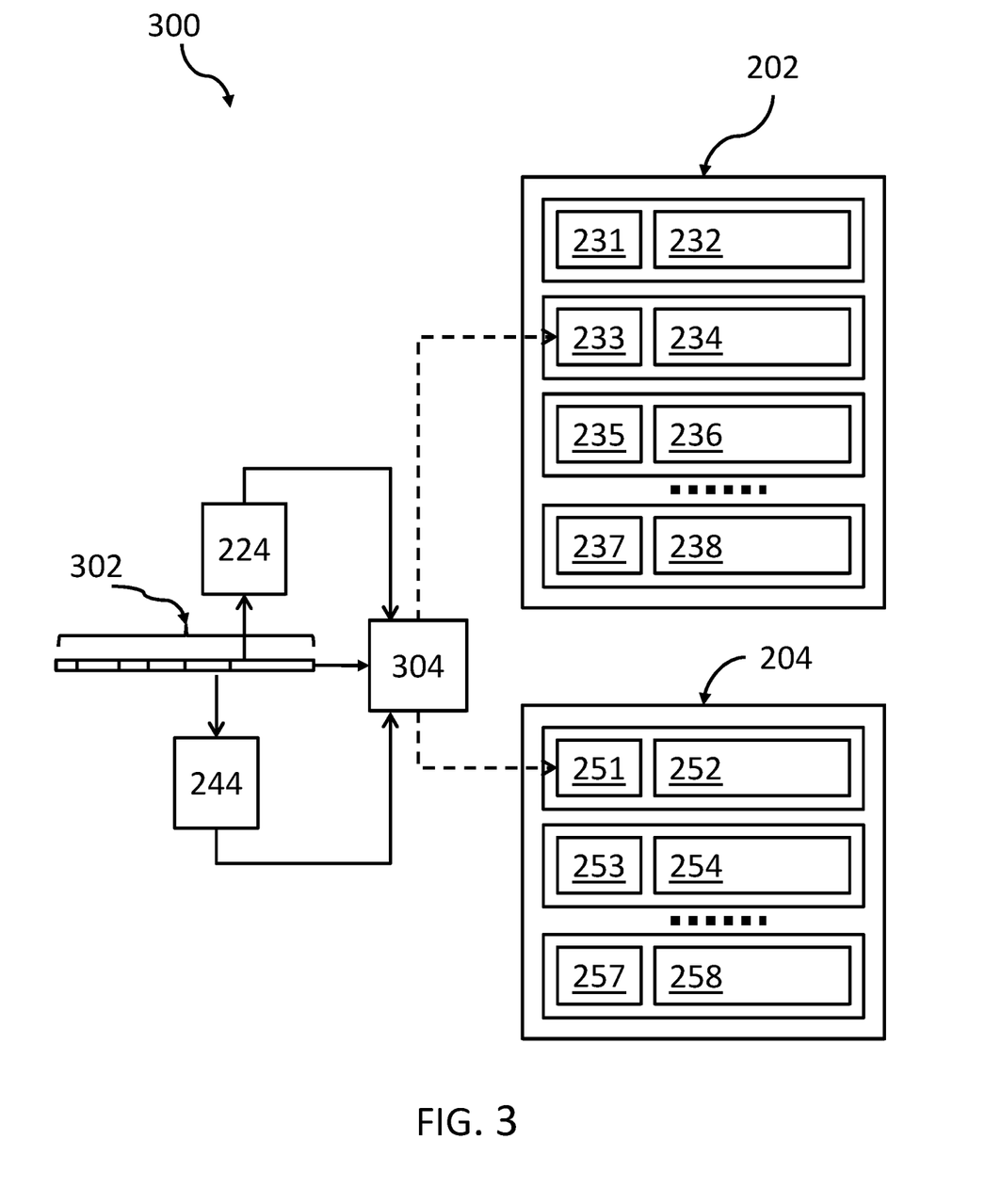
FIG. 3 shows a block diagram illustrating an insertion of a new record received in an embodiment.

FIG. 3 shows a block diagram illustrating an insertion of a new record 302 received. It comprises also different field as explained in FIG. 2. The data structure 202 comprising the blocking keys 231, 233, 235, 237, as well as lists 232, 234, 236, 238 with references to records in the RDS 216 relating to the first attribute and the data structure 204 comprising the blocking keys 251, 253, 237, as well as the lists 252, 254, 258 with references to records in the RDS 216 relating to the second attribute are identical to the ones in FIG. 2.

To the newly received record 302, the locality sensitive hashing function 224 or the second locality sensitive hashing function 244—e.g., MinHash or SimHash is applied −1 in order to identify one of the blocks (comprising the blocking key and the list of surrogate ID values), to which the newly received record 302 is related to. The scoring function 304 related the newly received record 302—depending on the attribute—to one of the entries in the data structures 202 or 204.

The scoring function 304 establishes a best match between the newly received record 302 and one of the records related to the final surrogate identifier values in the blocks. In the shown example, the locality sensitive hashing function identified exemplary the block with the blocking key 233 (for the first attribute) in which the scoring function 304 also determines the final surrogate identifier value of the best matching record 218 (compare FIG. 2). FIG. 3 illustrates the power of the proposed concept indicating that only a very limited number of blocks need to be checked by the scoring function to find a best match between the newly incoming record 302 and the records identified by the final surrogate identifier values within one of the plurality of blocks. This concept becomes even more powerful because many of the lists of surrogate identifiers 232, 234, 236, 238 (for the first attribute), as well as 252, 254, 258 (for the second attribute) may only comprise one single final surrogate identifier value; thus, the applying the scoring function 304 may not be required for these cases.

Especially, if one the blocks of the first surrogate identifiers 232, 234, 236, 238 are intersected with the second surrogate identifiers 252, 254, 258, it is even more like that the resulting intersected set (with the algorithm explained above) comprises only one single final surrogate identifier value, which renders the proposed concept even more powerful.

Figure 4:
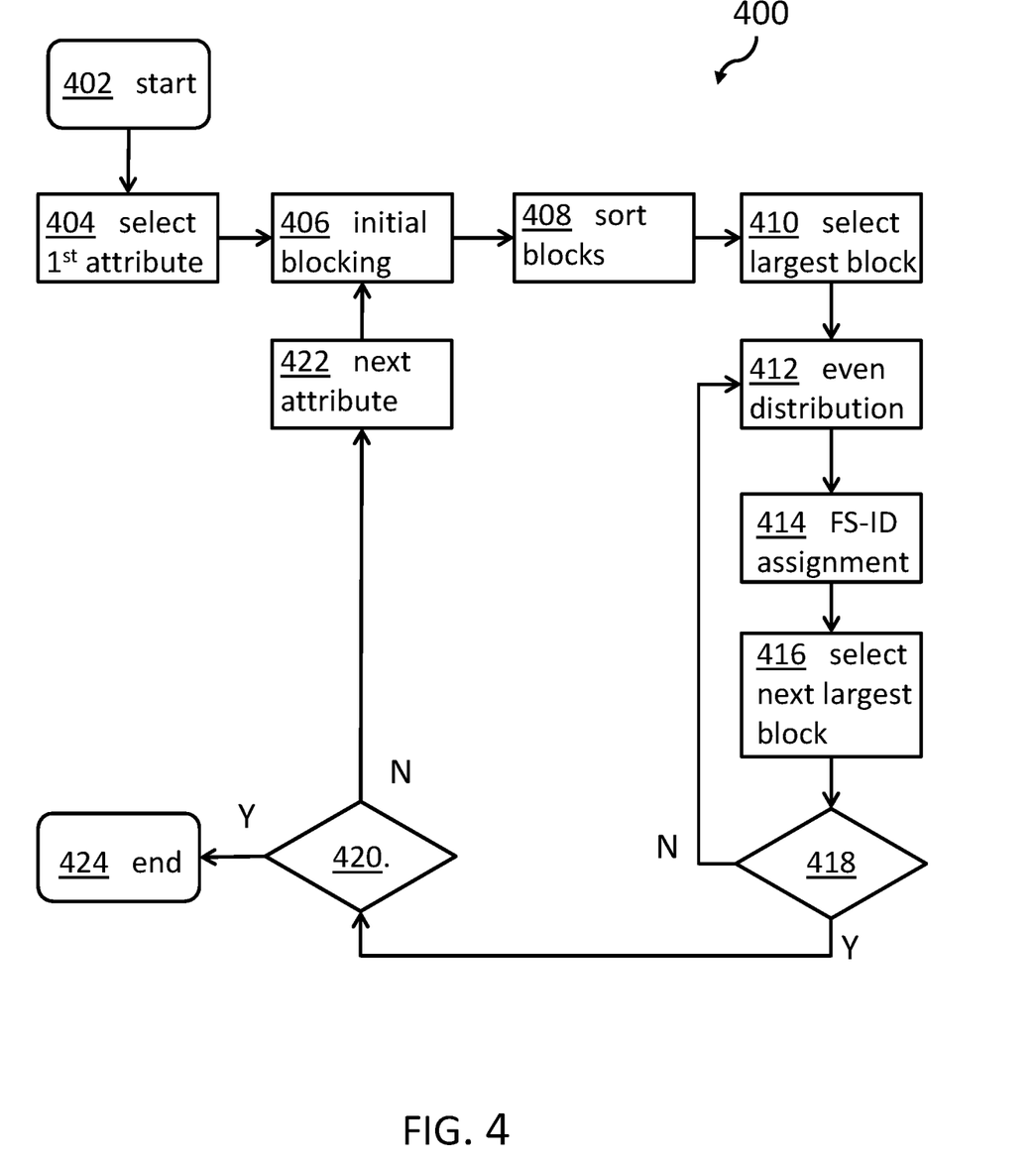
FIG. 4 shows a block diagram of an embodiment of the proposed concept for a plurality of attributes.

FIG. 4 shows a block diagram of an embodiment 400 of the proposed concept for a plurality of attributes. The process starts at 402. Firstly, a first attribute is selected, 404. An initial blocking is determined, 406, by applying the locality sensitive hashing function to the first attribute of the records in the reference data set. Then the blocks are sorted, 408, according to their size, i.e., according to their cardinality. The largest block is selected, 410, and an even or uniform distribution of the originally initial surrogate identifier values is determined, 412. This process creates the final surrogate identifier values (FS-IDs) which are assigned, 414, to records replacing the initial surrogate identifier values. As part of the setup process, also the conflicts in the final surrogate identifier assignment are handled (not shown).

Then, the next largest block is selected, 416. If it is determined, 418, that not all records have surrogate identifiers—case "N"—the process loops back to step 412. In the other case—case "Y"—the process continues to the determination 420 whether all attributes have been processed. If that is the case—case "Y"—the process ends at 424.

If that is not the case—case "N"—the next attribute is selected, 422, and the initial blocking is determined, 406, i.e., the initial surrogate identifier values are assigned to records of the reference data set building the named blocks.

Figure 5:
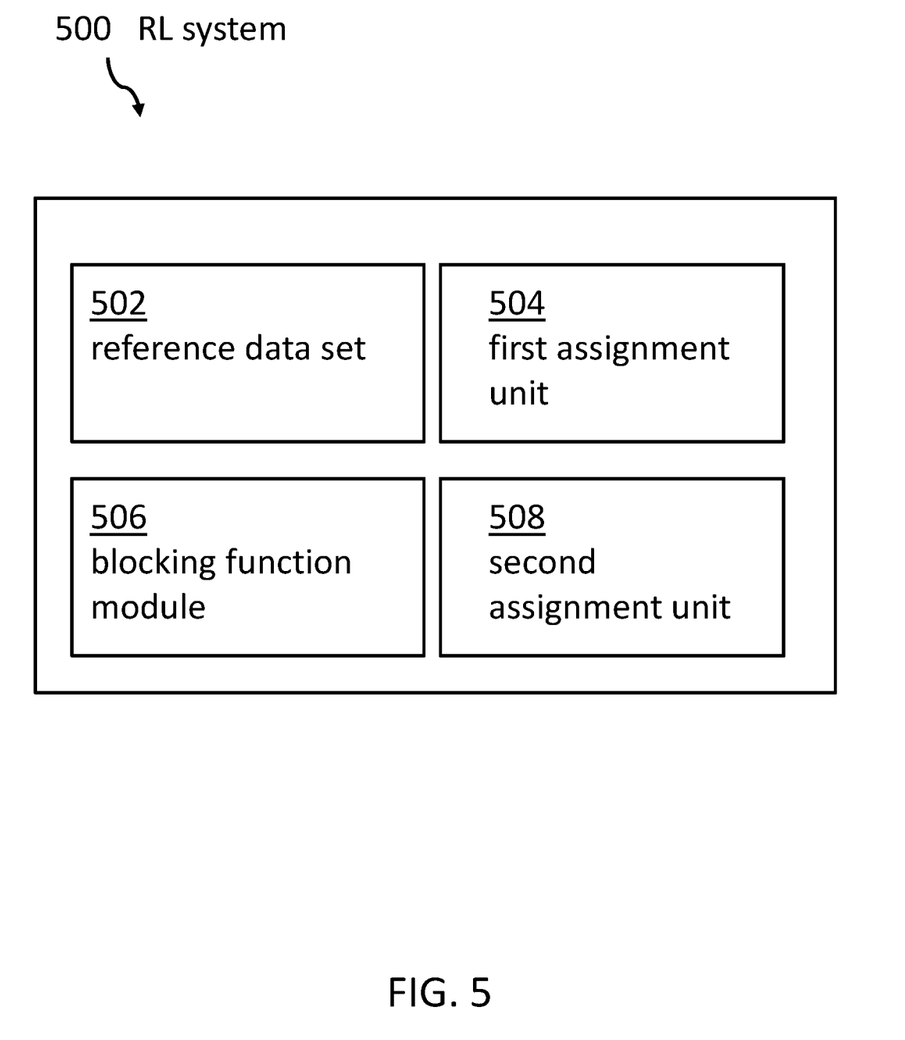
FIG. 5 shows a block diagram of an embodiment of the record linkage system.

For completeness reasons, FIG. 5 shows a block diagram of an embodiment of the record linkage system 500 for a record linkage of an incoming record to a reference data set. The system comprises a reference data set 502 comprising a plurality of records. Each of the records of the reference data set comprises a plurality of attributes.

The record linkage system 500 also comprises a first assignment unit 504 adapted for assigning each of the plurality of records an initial surrogate identifier value and a blocking function module 506 adapted for assigning a plurality of block identifiers to each of the records by applying a locality sensitive hashing function to a predefined attribute of the records. This results in the plurality of block identifiers, and a second assignment unit 508 is adapted for determining a final surrogate identifier value to each of the records assigned to one of the blocks such that the final surrogate identifier values in each block are uniformly distributed.

Figure 6:
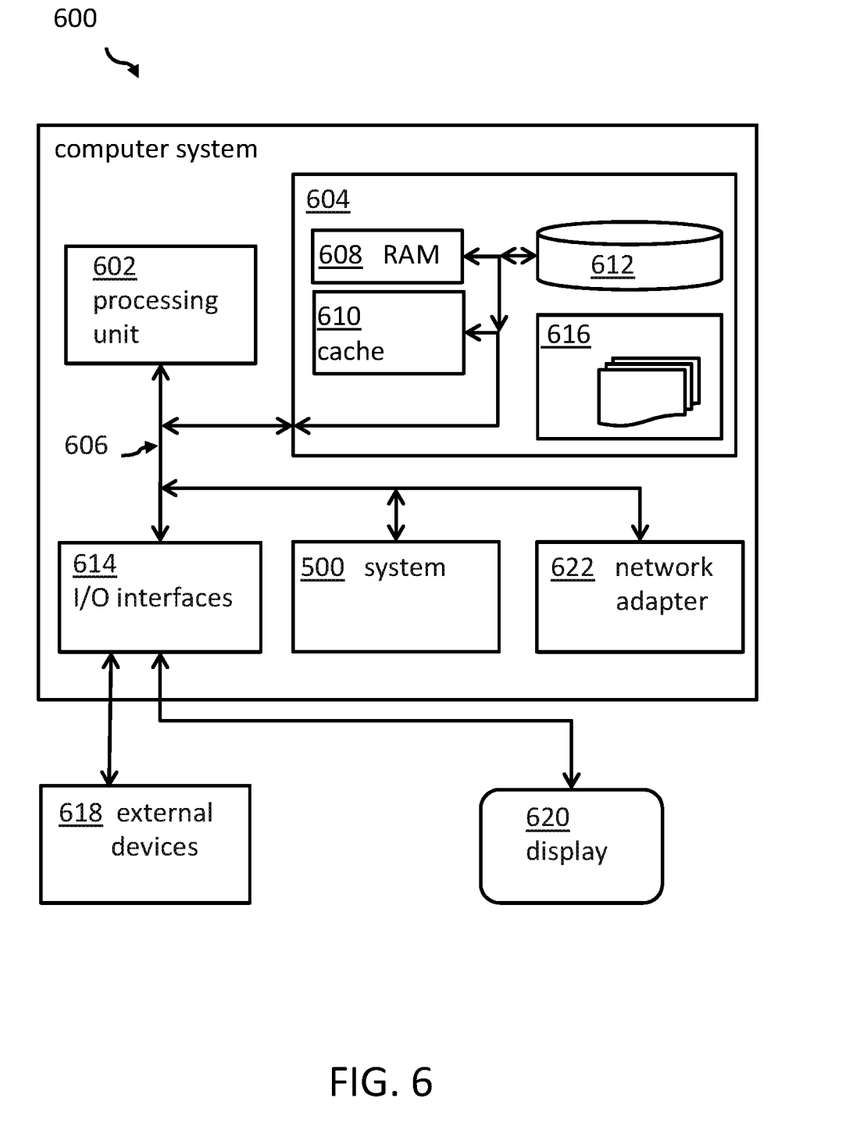
FIG. 6 shows an embodiment of a computing system comprising the record linkage system according to FIG. 5.

Embodiments of the invention may be implemented together with virtually any type of computer, regardless of the platform being suitable for storing and/or executing program code. FIG. 6 shows, as an example, a computing system 600 suitable for executing program code related to the proposed method.

The computing system 600 is only one example of a suitable computer system, and is not intended to suggest any limitation as to the scope of use or functionality of embodiments of the invention described herein, regardless, whether the computer system 600 is capable of being implemented and/or performing any of the functionality set forth hereinabove. In the computer system 600, there are components, which are operational with numerous other general purpose or special purpose computing system environments or configurations. Examples of well-known computing systems, environments, and/or configurations that may be suitable for use with computer system/server 600 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 600 may be described in the general context of computer system-executable instructions, such as program modules, being executed by a computer system 600. Generally, program modules may include routines, programs, objects, components, logic, data structures, and so on that perform particular tasks or implement particular abstract data types. Computer system/server 600 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 600 is shown in the form of a general-purpose computing device. The components of computer system/server 600 may include, but are not limited to, one or more processors or processing units 602, a system memory 604, and a bus 606 that couple various system components including system memory 604 to the processor 602. Bus 606 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 600 typically includes a variety of computer system readable media. Such media may be any available media that is accessible by computer system/server 600, and it includes both, volatile and non-volatile media, removable and non-removable media.

The system memory 604 may include computer system readable media in the form of volatile memory, such as random access memory (RAM) 608 and/or cache memory 610. Computer system/server 600 may further include other removable/non-removable, volatile/non-volatile computer system storage media. By way of example only, a storage system 612 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 606 by one or more data media interfaces. As will be further depicted and described below, memory 604 may include at least one program product having a set (e.g., at least one) of program modules that are configured to carry out the functions of embodiments of the invention.

The program/utility, having a set (at least one) of program modules 616, may be stored in memory 604 by way of example, and not limiting, as well as an operating system, one or more application programs, other program modules, and program data. Each of the operating systems, one or more application programs, other program modules, and program data or some combination thereof, may include an implementation of a networking environment. Program modules 616 generally carry out the functions and/or methodologies of embodiments of the invention, as described herein.

The computer system/server 600 may also communicate with one or more external devices 618 such as a keyboard, a pointing device, a display 620, etc.; one or more devices that enable a user to interact with computer system/server 600; and/or any devices (e.g., network card, modem, etc.) that enable computer system/server 600 to communicate with one or more other computing devices. Such communication can occur via Input/Output (I/O) interfaces 614. Still yet, computer system/server 600 may communicate with one or more networks such as a local area network (LAN), a general wide area network (WAN), and/or a public network (e.g., the Internet) via network adapter 622. As depicted, network adapter 622 may communicate with the other components of the computer system/server 600 via bus 606. It should be understood that, although not shown, other hardware and/or software components could be used in conjunction with computer system/server 600. Examples, include, but are not limited to: microcode, device drivers, redundant processing units, external disk drive arrays, RAID systems, tape drives, and data archival storage systems, etc.

Additionally, the record linkage system 500 for a record linkage of an incoming record to a reference data set may be attached to the bus system 606.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

In embodiments, the inventive concept may be summarized by the following clauses:

1. A computer-implemented method for record linkage of an incoming record to a reference data set, said method comprising providing a reference data set comprising a plurality of records, each record comprising a plurality of attributes, assigning each of said plurality of records an initial surrogate identifier value, assigning a plurality of block identifiers to each of said records by applying a locality sensitive hashing function to a predefined attribute of said records, resulting in said plurality of said block identifiers, and determining a final surrogate identifier value to each of said records assigned to one of said blocks such that said final surrogate identifier values in each block are uniformly distributed.

2. The method according to clause 1, also comprising
sorting said block identifiers by its cardinality, and
wherein said determining said final surrogate identifier value FS-ID comprises performing for each block, starting with said largest block, $$FS\text{-}ID = \text{offset} + i \cdot \text{gap}, \text{ wherein}$$

FS-ID=final surrogate identifier value,
gap=E/B and offset=gap/2, wherein
E=said total number of records in said reference data set,
B=number of records in said given block, and
i=said number of a position of an initial surrogate identifier value in a given block, such that $0=i<B$.

3. The method according to clause 2, wherein, in case a final surrogate identifier value is determined which value has already been determined during said determining said final surrogate identifier values of a previous block, a next closest final surrogate identifier value is chosen for said respective record, provided that final surrogate identifier values in said respective block continue to be uniformly distributed.

4. The method according to clause 3, also comprising
testing whether a next closest available value for the final surrogate identifier provides a uniform distribution for a given block B according to the following formula:

$$\text{pos}(id) = \text{round}[(B-1) \cdot ((id - B(0)) / B(B-1) - B(0))],$$

$$\forall i \in [0, B-1]: B(i) == B(\text{pos}(B(i))),$$

$$\text{pos}(id) = \text{round}[(B-1) \cdot ((id - B(0)) / B(B-1) - B(0))],$$
wherein id=chosen next closest final surrogate identifier value,
pos=position of said value id in a given block,
B=number of records in said given block, and
B(x)=value of identifier in array B(x) at position x.

5. The method according to any of the preceding clauses, also comprising assigning said determined final surrogate identifier value also to records in subsequent blocks which have said same initial surrogate identifier value as said record having been assigned said final surrogate identifier value.

6. The method according to any of the preceding clauses, wherein said blocks with assigned records are organized as one or more arrays of surrogate identifiers using said surrogate identifiers as index in said reference data set.

7. The method according to any of the preceding clauses, wherein said predefined attribute of said records is a combination of at least two attributes.

8. The method according to any of the preceding clauses, wherein said steps of assigning a plurality of block identifiers comprises determining a final surrogate identifier value for a second predefined attribute.

9. The method according to any of the preceding clauses, also comprising receiving a new record comprising said predefined attribute applying said locality sensitive hashing function to said predefined attribute of said newly received record resulting in an access block number, and accessing said block having said resulting access block number.

10. The method according to any of the preceding clauses, also comprising assigning a plurality of second block identifiers to each of said records by applying a locality sensitive hashing function to a second predefined attribute of said records, resulting in said plurality of said second block identifiers, determining a second final surrogate identifier value to each of said records assigned to one of said blocks such that said second final surrogate identifier values in each block are uniformly distributed.

11. The method according to clause 10, also comprising receiving a new record comprising said predefined attribute and said second predefined attribute, applying a second locality sensitive hashing function to said predefined attribute resulting in an access block number, applying the second locality sensitive hashing function to said second predefined attribute resulting in a second access block number, and joining said block having assigned said access block number and said second access block number, by looking up each surrogate identifier value, at the following pre-determined position:

$$\mathrm{pos}(id)=\mathrm{round}[(B-1)*((id-B(0)/B(B-1)-B(0))].$$

12. A record linkage system for a record linkage of an incoming record to a reference data set, said system comprising a reference data set comprising a plurality of records, each record comprising a plurality of attributes, a first assignment unit adapted for assigning each of said plurality of records an initial surrogate identifier value, a blocking function module adapted for assigning a plurality of block identifiers to each of said records by applying a locality sensitive hashing function to a predefined attribute of said records, resulting in said plurality of said block identifiers, and a second assignment unit determining a final surrogate identifier value to each of said records assigned to one of said blocks such that said final surrogate identifier values in each block are uniformly distributed.

13. The system according to clause 12, also comprising sorting said block identifiers by its cardinality, and wherein said determining said final surrogate identifier value FS-ID comprises performing for each block, starting with said largest block, $$\textit{FS-ID}=\mathrm{offset}+i*\mathrm{gap}, \mathrm{wherein}$$

FS-ID=final surrogate identifier value,
gap=E/B and offset=gap/2, wherein
E=said total number of records in said reference data set,
B=number of records in said given block, and
i=said number of a position of an initial surrogate identifier value in a given block, such that $0=i<B$.

14. The system according to clause 13, wherein in case a final surrogate identifier value is determined which value has already been determined during said determining said final surrogate identifiers value of a previous block a next closest final surrogate identifier value is chosen for said respective record, provided that final surrogate identifier values in said respective block continue to be uniformly distributed.

15. The system according to clause 14, also comprising testing whether a next closest available value for the final surrogate identifier provides a uniform distribution for a given block B according to the following formula:

$$\mathrm{pos}(id)=\mathrm{round}[(B-1)*((id-B(0)/B(B-1)-B(0))],$$
wherein id=chosen next closest final surrogate identifier value,
pos=position of said value id in a given block,
B=number of records in said given block, and
B(x)=value of identifier in array B(x) at position x.

16. The system according to any of the clauses 12 to 15, also comprising assigning said determined final surrogate identifier value also to records in subsequent blocks which have said same initial surrogate identifier value as said record having been assigned said final surrogate identifier value.

17. The system according to any of the clauses 12 to 16, wherein said blocks with assigned records are organized as one or more arrays of surrogate identifiers using said surrogate identifier as index in said reference data set.

18. The system according to any of the clauses 12 to 17, wherein said predefined attribute of said records is a combination of at least two attributes and/or wherein said steps of assigning a plurality of block identifiers and determining a final surrogate identifier value for a second predefined attribute.

19. The system according to any of the clauses 12 to 18, also comprising receiving a new record comprising said predefined attribute applying said locality sensitive hashing function to said predefined attribute of said newly received record resulting in an access block number, and accessing said block having said resulting access block number.

20. A computer program product for record linkage of an incoming record to a reference data set, said documents being coded in said typesetting language TeX, said computer program product comprising a computer readable storage medium having program instructions embodied therewith, said program instructions being executable by one or more computing systems or controllers to cause said one or more computing systems to provide a reference data set comprising a plurality of records, each record comprising a plurality of attributes, assign each of said plurality of records an initial surrogate identifier value, assign a plurality of block identifiers to each of said records by applying a locality sensitive hashing function to a predefined attribute of said records, resulting in said plurality of said block identifiers, and determine a final surrogate identifier value to each of said records assigned to one of said blocks such that said final surrogate identifiers values in each block are uniformly distributed.

What is claimed is:

1. A computer-implemented method for record linkage of an incoming record to a reference data set, said method comprising:

providing a reference data set comprising a plurality of records, each record comprising a plurality of attributes, assigning each of said plurality of records an initial surrogate identifier value, assigning a plurality of block identifiers to each of said records by applying a locality sensitive hashing function to a predefined attribute of said records, resulting in said plurality of said block identifiers, and determining a final surrogate identifier value to each of said records assigned to one of said block identifiers such that said final surrogate identifier values in each block identifier are uniformly distributed, wherein the reference data set can be searched in constant time by linear interpolation of final surrogate identifier values sorting said block identifiers by its cardinality, wherein said determining said final surrogate identifier value FS-ID comprises performing for each block identifier as a given block identifier, starting with a largest of the block identifiers, $FS\text{-}ID = \text{offset} + i*\text{gap}$, wherein FS-ID=final surrogate identifier value, gap=E/B and offset=gap/2, wherein E=total number of records in said reference data set, B=number of records in said given block identifier, and i=number of a position of an initial surrogate identifier value in the given block identifier, such that $0 <= i < B$, wherein, in case a final surrogate identifier value is determined which value has already been determined during said determining said final surrogate identifier values of a previous block identifier, a next closest final surrogate identifier value is chosen for a respective record, provided that final surrogate identifier values in said given block identifier continue to be uniformly distributed, testing whether a next closest available value for the final surrogate identifier provides a uniform distribution for the given block identifier according to the following formula:

$\text{pos}(id) = \text{round}[(B-1)*((id-B(0)/B(B-1)-B(0))]$, and determining whether, $\forall i \in [0, B-1]: B(i) == B(\text{pos}(B(i)))$, wherein id=chosen next closest final surrogate identifier value, pos=position of said value id in the given block identifier, B=number of records in said given block identifier, and B( )represents an array of identifier values in said given block identifier, wherein B(x)=value of identifier in said B( ) at position x.

2. The method according to claim 1, also comprising:

assigning said determined final surrogate identifier value also to records in subsequent block identifiers which have said same initial surrogate identifier value as said record having been assigned said final surrogate identifier value.

3. The method according to claim 1, wherein said block identifiers with assigned records are organized as one or more arrays of surrogate identifiers using said surrogate identifiers as index in said reference data set.

4. The method according to claim 1, wherein said predefined attribute of said records is a combination of at least two attributes.

5. The method according to claim 1, wherein said steps of assigning a plurality of block identifiers comprises determining a final surrogate identifier value for a second predefined attribute.

6. The method according to claim 1, also comprising:

receiving a new record comprising said predefined attribute applying said locality sensitive hashing function to said predefined attribute of said newly received record resulting in an access block number, and accessing said block identifier having said resulting access block number.

7. A computer-implemented method for record linkage of an incoming record to a reference data set, said method comprising:

providing a reference data set comprising a plurality of records, each record comprising a plurality of attributes, assigning each of said plurality of records an initial surrogate identifier value, assigning a plurality of block identifiers to each of said records by applying a locality sensitive hashing function to a predefined attribute of said records, resulting in said plurality of said block identifiers, determining a final surrogate identifier value to each of said records assigned to one of said block identifiers such that said final surrogate identifier values in each block identifier are uniformly distributed, wherein the reference data set can be searched in constant time by linear interpolation of final surrogate identifier values, assigning a plurality of second block identifiers to each of said records by applying a locality sensitive hashing function to a second predefined attribute of said records, resulting in said plurality of said second block identifiers, determining a second final surrogate identifier value to each of said records assigned to one of said block identifiers such that said second final surrogate identifier values in each block identifier are uniformly distributed, receiving a new record comprising said predefined attribute and said second predefined attribute, applying a second locality sensitive hashing function to said predefined attribute resulting in an access block number, applying the second locality sensitive hashing function to said second predefined attribute resulting in a second access block number, and joining said block identifier having assigned said access block number and said second access block number, by looking up each surrogate identifier value, at the following pre-determined position:

$\text{pos}(id) = \text{round}[(B-1)*((id-B(0)/B(B-1)-B(0))]$, wherein id=chosen final surrogate identifier value, pos=position of said value id in a given block identifier, B=number of records in said given block identifier, and B( )represents an array of identifier values in said given block identifier, wherein B(x)=value of identifier in said B( ) at position x.

8. A record linkage system for a record linkage of an incoming record to a reference data set, said system comprising:

a reference data set comprising a plurality of records, each record comprising a plurality of attributes, a processor configured for assigning each of said plurality of records an initial surrogate identifier value, a blocking function module adapted for assigning a plurality of block identifiers to each of said records by applying a locality sensitive hashing function to a predefined attribute of said records, resulting in said plurality of said block identifiers, the processor determining a final surrogate identifier value to each of said records assigned to one of said block identifiers such that said final surrogate identifier values in each block identifier are uniformly distributed, wherein the reference data set can be searched in constant time by linear interpolation of final surrogate identifier values, the processor further sorting said block identifiers by its cardinality, wherein said determining said final surrogate identifier value FS-ID comprises performing for each block identifier as a given block identifier, starting with a largest of the block identifiers, FS-ID=offset+i*gap, wherein FS-ID=final surrogate identifier value, gap=E/B and offset=gap/2, wherein E=total number of records in said reference data set, B=number of records in said given block identifier, and i=number of a position of an initial surrogate identifier value in the given block identifier, such that $0 <= i < B$, wherein in case a final surrogate identifier value is determined which value has already been determined during said determining said final surrogate identifiers value of a previous block identifier a next closest final surrogate identifier value is chosen for a respective record, provided that final surrogate identifier values in said given block identifier continue to be uniformly distributed, the processor further testing whether a next closest available value for the final surrogate identifier provides a uniform distribution for the given block identifier according to the following formula:

$$pos(id)=round\ [(B-1)*((id-B(0)/B(B-1)-B(0))],$$

and determining whether, $\forall i \in [0, B-1]: B(i)=B(pos(B(i)))$, wherein id=chosen next closest final surrogate identifier value, pos=position of said value id in the given block identifier, B=number of records in said given block identifier, and B( ) represents an array of identifier values in said given block identifier, wherein B(x)=value of identifier in said B( ) at position x.

9. The system according to claim 8, also comprising:
assigning said determined final surrogate identifier value also to records in subsequent block identifiers which have said same initial surrogate identifier value as said record having been assigned said final surrogate identifier value.

10. The system according to claim 8, wherein said block identifiers with assigned records are organized as one or more arrays of surrogate identifiers using said surrogate identifier as index in said reference data set.

11. The system according to claim 8, wherein said predefined attribute of said records is a combination of at least two attributes
and/or wherein said steps of assigning a plurality of block identifiers and determining a final surrogate identifier value for a second predefined attribute.

12. The system according to claim 8, also comprising:
receiving a new record comprising said predefined attribute applying said locality sensitive hashing function to said predefined attribute of said newly received record resulting in an access block number, and accessing said block identifier having said resulting access block number.

13. A computer program product for record linkage of an incoming record to a reference data set, said computer program product comprising a computer readable storage medium having program instructions embodied therewith, said program instructions being executable by one or more computing systems or controllers to cause said one or more computing systems to:

provide a reference data set comprising a plurality of records, each record comprising a plurality of attributes, assign each of said plurality of records an initial surrogate identifier value, assign a plurality of block identifiers to each of said records by applying a locality sensitive hashing function to a predefined attribute of said records, resulting in said plurality of said block identifiers, determine a final surrogate identifier value to each of said records assigned to one of said block identifiers such that said final surrogate identifiers values in each block identifier are uniformly distributed, wherein the reference data set can be searched in constant time by linear interpolation of final surrogate identifier values, assign a plurality of second block identifiers to each of said records by applying a locality sensitive hashing function to a second predefined attribute of said records, resulting in said plurality of said second block identifiers, determine a second final surrogate identifier value to each of said records assigned to one of said block identifiers such that said second final surrogate identifier values in each block identifier are uniformly distributed, receive a new record comprising said predefined attribute and said second predefined attribute, apply a second locality sensitive hashing function to said predefined attribute resulting in an access block number, apply the second locality sensitive hashing function to said second predefined attribute resulting in a second access block number, and join said block identifier having assigned said access block number and said second access block number, by looking up each surrogate identifier value, at the following pre-determined position:

$$pos(id)=round[(B-1)*((id-B(0)/B(B-1)-B(0))],$$
wherein id=chosen final surrogate identifier value, pos=position of said value id in a given block identifier, B=number of records in said given block identifier, and B( ) represents an array of identifier values in said given block identifier, wherein B(x)=value of identifier in said B( ) at position x.

14. The method of claim 1, wherein each attribute of the plurality of attributes associated with a record of said records represents an identifiable field in the record identifying one criterion of an item the record relates to, and wherein the predefined attribute is one of said each attribute.

15. The system of claim 8, wherein each attribute of the plurality of attributes associated with a record of said records represents an identifiable field in the record identifying one criterion of an item the record relates to, and wherein the predefined attribute is one of said each attribute.

16. The computer program product of claim 13, wherein each attribute of the plurality of attributes associated with a record of said records represents an identifiable field in the record identifying one criterion of an item the record relates to, and wherein the predefined attribute is one of said each attribute.

\* \* \* \* \*